United States Patent [19]

Mossel et al.

[11] 4,081,714
[45] Mar. 28, 1978

[54] METHOD OF COATING THE INNER WALL OF A LOW-PRESSURE MERCURY VAPOR DISCHARGE LAMP WITH LUMINESCENT MATERIAL

[75] Inventors: Anthonius Clemens Mossel, Eindhoven; Joannes Petrus Hertogh, Loon op Zand, both of Netherlands

[73] Assignee: U.S. Philips Corporation, New York, N.Y.

[21] Appl. No.: 732,472

[22] Filed: Oct. 14, 1976

[30] Foreign Application Priority Data

Oct. 17, 1975 Netherlands .......................... 7512190

[51] Int. Cl.² .......................................... H01J 61/46
[52] U.S. Cl. ........................................ 313/493; 427/28; 427/67; 427/71; 427/106; 252/301.36; 313/221
[58] Field of Search ................ 427/25, 66, 64, 71, 427/105, 106, 230, 157, 28, 67; 252/301.36; 313/493, 221, 182

[56] References Cited

U.S. PATENT DOCUMENTS

| 2,478,387 | 8/1949 | Graham et al. ............... 252/301.36 |
| 2,749,251 | 6/1956 | Shapiro ........................ 252/301.36 |
| 2,854,413 | 9/1958 | Geary ............................... 427/157 |
| 2,940,864 | 6/1960 | Watson ............................... 427/25 |
| 3,947,608 | 3/1976 | Duinker et al. ...................... 427/66 |

*Primary Examiner*—Ralph S. Kendall
*Attorney, Agent, or Firm*—Frank R. Trifari; Robert S. Smith

[57] ABSTRACT

A method of electrostatic coating the inner wall of a low-pressure mercury vapour discharge lamp with luminescent material. Stearic acid and/or palmetic acid and/or salts thereof are added to the luminescent material together with nitrate in order to obtain a proper adhesion of the luminescent powder to the wall of the lamp.

5 Claims, 1 Drawing Figure

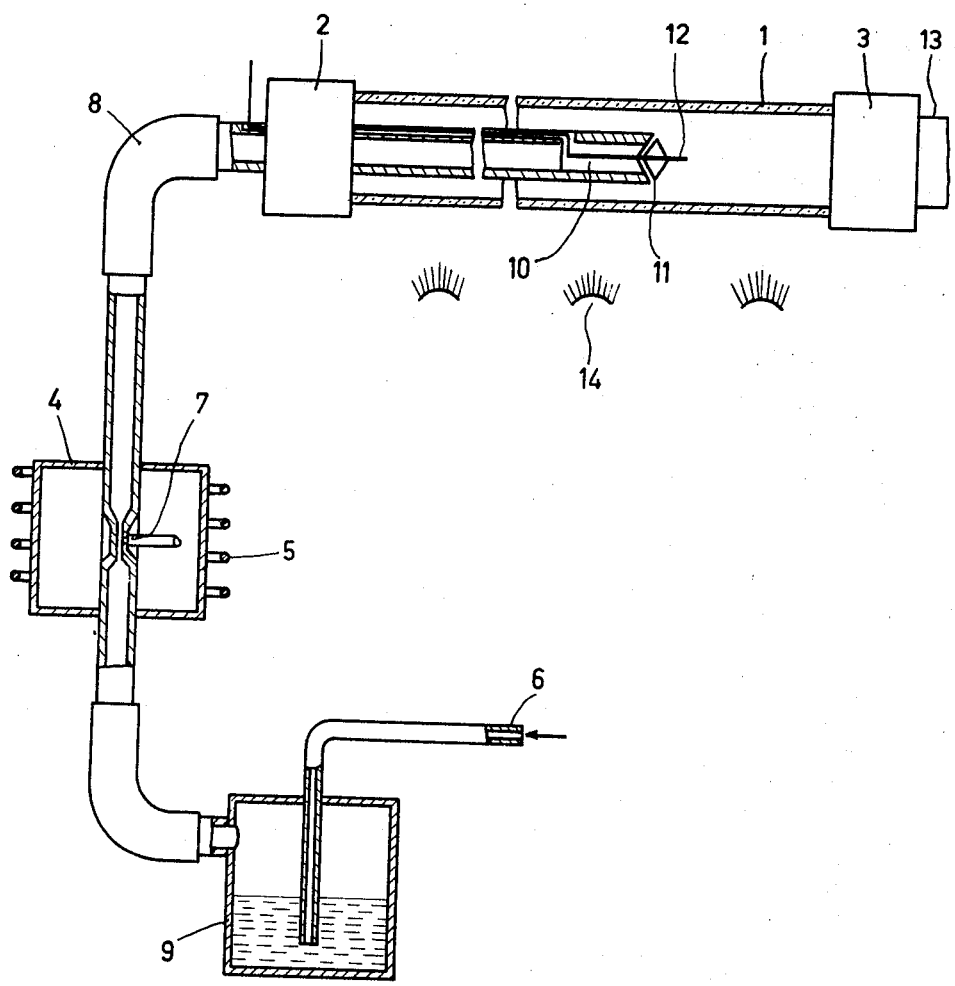

METHOD OF COATING THE INNER WALL OF A LOW-PRESSURE MERCURY VAPOR DISCHARGE LAMP WITH LUMINESCENT MATERIAL

The invention relates to a method of coating the inner wall of a low-pressure mercury vapour discharge lamp with luminescent material in which finely dispersed luminescent material is introduced into the lamp envelope by means of a gas stream. The luminescent material is conveyed by means of an electric field and adheres to the wall of the lamp envelope.

In the production of low-pressure mercury vapour discharge lamps it is customary to deposit a coating of luminescent material on the inner wall of a usually tubular lamp envelope by spraying a suspension of the luminescent material in a medium which contains a binder, for example nitrocellulose and an appropriate solvent, for example butylacetate into the lamp envelope. A disadvantage of this method is that the use of the suspension necessitates long drying periods. In addition, relatively large quantities of luminescent material are wasted owing to dripping. Furthermore, the luminescent coat is usually not very uniform which is detrimental to the light output of the lamps and produces an inferior appearance.

To avoid the above drawbacks, U.S. Pat. No. 2,426,016 proposes to apply the luminescent material to the inner wall of a low-pressure mercury vapour discharge lamp by means of an electric field.

Such a method is also used to coat the inner wall of the outer envelope of a high-pressure mercury vapour discharge lamp. In that method it is customary to add a small quantity of silicon dioxide to the luminescent material to improve the adhesion. When silicon dioxide is used in the coating material of low-pressure mercury vapour discharge lamps this oxide absorbs mercury during operation of the lamp which causes a pronounced decrease in the light output of such lamps.

A method according to the invention is characterized in that prior to introducing the luminescent material into the envelope a quantity of 0.01% by weight to 1.0% by weight of stearic acid and/or palmetic acid and/or their salts, as well as a quantity of 0.1% by weight to 3.0% by weight of a nitrate is added.

This method has the advantage that the particles of the luminescent material are highly charged and that the applied coating absorbs mercury only to a slight degree. A further advantage of adding the above mentioned acids and/or salts to the luminescent material is that not only charging the particles proceeds satisfactorily but also that the adhesion to the wall is optimum.

In a particular embodiment of the method according to the invention a quantity of 0.01% by weight to 1.0% by weight of calcium stearate is added to the luminescent material. When this material is used the charge distribution over the luminescent material is particularly uniform. Furthermore, the charge which is applied to the particles is then so large that expulsion of the charged particles which are still in motion, by those which have already settled to the wall of the lamp envelope is avoided.

By preference, in accordance with the invention a quantity of 0.1% by weight to 3.0% by weight of strontium or calcium nitrate is added to the stearic acid and/or palmetic acid and/or to the salts thereof. In combination with stearic and/or palmetic acids and/or salts thereof the use of these nitrates results in a very good adhesion of the luminescent material to the wall. Also the stacking of the granules is very favourable which results in a very uniform layer.

One of the means by which the luminescent material may be introduced into the envelope of the lamp is a spray gun having a voltage of, for example 25 kilovolts with respect to the wall, which is preferably grounded and from which gun the luminescent powder is sprayed into the envelope together with the charging and adhesion media. In the generated electric field the charged particles move to the wall of the lamp envelope.

In a special embodiment of a method according to the invention there is added to the luminescent material besides stearic acid and/or palmetic acid and/or one or more salts thereof also between 0.05% by weight and 0.5% by weight of finely dispersed aluminium oxide having an average particle size smaller than 0.1 $\mu$m. The use of aluminium oxide in the above-mentioned procedure has the advantage that the granular particles of the luminescent material do not form aggreates when transported through the spray pipe. In addition it appears that this aluminium oxide positively influences the adhesion of the particles to the wall without being detrimental to the light output.

The invention will now be further explained with reference to an example for preparing a mixture which is introduced into the lamp envelope.

Preparing the mixture to be used

A quantity of 0.25 grams of calcium stearate (Ca$(C_{18}H_{35}O_2)_2$, melting point $\pm$ 180° C) and 1.25 gram of calcium nitrate (Ca$(No_3)_2$, melting point $\pm$ 560° C) is added to a suspension of 500 grams of luminescent material, for example antimony- and manganese-activated calcium halophosphate (Ca$_{10}$(PO$_4$)$_6$F$_{1.7}$Cl$_{0.3}$) in 140 ml of ethanol. The composite suspension was stirred for approximately 5 minutes and was then evaporated to dryness at a temperature of approximately 125° C. To prevent the calcium halophosphate particles from aggregating during subsequent processing, a quantity of 0.5 grams of finely dispersed aluminium oxide having an average particle size smaller than 0.1 $\mu$m is added after the evaporation to dryness.

The powder mixture obtained in this way may now be introduced into the lamp envelope by means of an apparatus which is diagrammatically shown in the FIGURE.

In the FIGURE reference 1 indicates a tubular glass envelope to be coated. This lamp envelope is located between two holders 2 and 3 and rotates during the coating procedure. The powder mixture which must be brought into the lamp envelope is contained in a powder vessel 4 which, in order to avoid aggregation of the powder is heated to a temperature of approximately 80° C, for example by means of an electric heating coil 5. The powder is drawn into the spray pipe 8 by means of an injector 7, while compressed air the carrier gas is admitted at conduit 6. Before the injector 7 a water-filled wash bottle 9 is placed in the spray pipe for moistening the air (the carrier gas) in order to improve the adhesion of the powder to the wall 1. The spray pipe is connected to a glass tube, the end of which is provided with a nozzle 10, which can move in the longitudinal direction with respect to the lamp envelope. The nozzle 10 is provided with a narrow slit-like opening 11. During passage the granules of the luminescent material are electrostatically charged by friction. The nozzle is also provided with a so-called antenna 12 to which a high voltage, for example 25 kV with respect to the wall 1 is applied. The wall of the lamp envelope which is heated to a temperature of 200° C by means of a heating element 14 is preferably grounded. After leaving the opening 11 in the nozzle the granules which are electrostatically charged by means of friction move under the influence of the electric field which has been produced by the difference in voltage between the antenna and the wall, to the part of the wall located opposite the antenna. The entire inner wall of the lamp envelope is provided owing to a uniform movement of the nozzle from the holder 3 to the holder 2 with a uniform layer of luminescent material. At 13 the air escapes again from the lamp envelope. In one embodiment of the method in accordance with the invention it takes approximately 15 seconds to coat the entire envelope of a tubular lamp intended for a low-pressure mercury vapour discharge lamp having an output of 40W, a diameter of 36 mm and a length of 1200 mm. Immediately after coating the warm lamp envelope cools to approximately 25° C whereafter the tube is flushed with superheated steam of ± 200° C for approximately 20 seconds. This process considerably improves the adhesion of the luminescent material to the lamp envelope.

What is claimed is:

1. A method of coating the inner wall of the envelope of a low-pressure mercury vapour discharge lamp with luminescent material which comprises: providing a suspension of luminescent material, introducing into said suspension a quantity of 0.01% by weight to 1.0% by weight of a material selected from the group consisting of stearic acid, palmetic acid, and salts thereof, in addition to a quantity of 0.1% by weight to 3.0% by weight of a nitrate, introducing said suspension into the lamp envelope by means of a gas stream, and conveying said suspension by means of an electric field to the wall of the lamp envelope.

2. A method as claimed in claim 1, characterized in that a quantity selected from said group is entirely calcium stearate.

3. A method as claimed in claim 1 wherein said nitrate is selected from the group consisting of strontium and calcium nitrate.

4. A method as claimed in claim 1 further including the step of adding before said step of introducing said suspension into said envelope of adding 0.05 and 0.5% by weight of finely dispersed aluminium oxide having an average grain size smaller than 0.1 micron.

5. A low-pressure mercury vapour discharge lamp having a lamp envelope having the inner wall coated with a luminescent layer manufactured in accordance with a method as claimed in claim 1.

* * * * *